United States Patent [19]

Kuhn

[11] Patent Number: 4,932,440
[45] Date of Patent: Jun. 12, 1990

[54] VOLUME GOVERNOR FOR FLOWING MEDIA

[75] Inventor: Dieter Kuhn, Schlangenbad, Fed. Rep. of Germany

[73] Assignee: Activ GmbH Sanitärtechnik, Wiesbaden, Fed. Rep. of Germany

[21] Appl. No.: 856,648

[22] Filed: Apr. 25, 1986

[51] Int. Cl.⁵ .................... B05B 15/02; F15D 1/02
[52] U.S. Cl. ........................ 138/46; 138/40; 138/41; 138/43; 138/44; 138/45
[58] Field of Search ............. 138/40, 43, 44, 45, 138/46, 41, 89; 239/533.13, 533.14

[56] References Cited

U.S. PATENT DOCUMENTS 2,460,407  2/1949  Andrus ........................ 138/45 X
2,593,315  4/1952  Kroft ............................ 138/45
4,262,844  4/1981  Sekiya ......................... 138/45 X
4,313,471  2/1982  Lissau .......................... 138/45

FOREIGN PATENT DOCUMENTS 3437013  5/1985  Fed. Rep. of Germany ........ 138/45

Primary Examiner—James E. Bryant, III
Attorney, Agent, or Firm—Michael J. Striker

[57] ABSTRACT

A volume governor for flowing media under static pressure formed as a throttle member and including a segmented cone with the angle of cone of about 90° and made of plastics, a bore formed at an open apex is closed with a plug. The plug is made of elastic material with high damping properties. The bottom of the cone is closed with a perforated bottom plate.

1 Claim, 1 Drawing Sheet

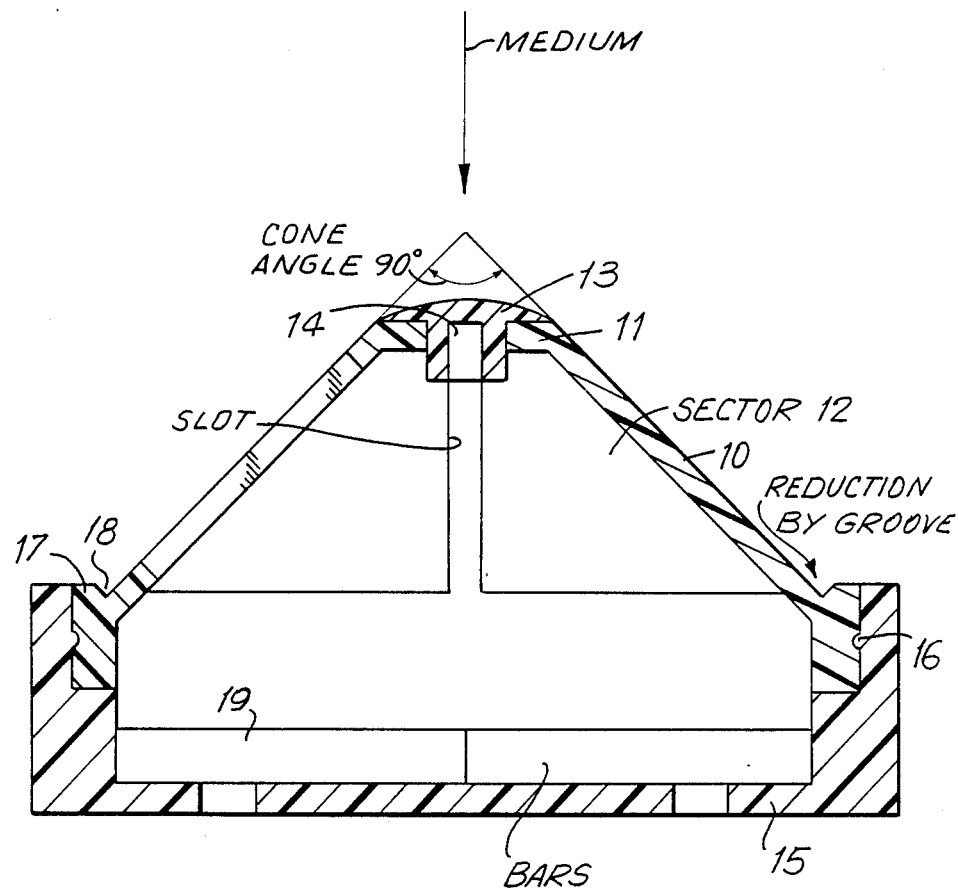

VOLUME GOVERNOR FOR FLOWING MEDIA

BACKGROUND OF THE INVENTION

The present invention relates to a volume governor for a flowing medium under static pressure.

The volume governor of the type under discussion is formed as a throttle member and is comprised of a hollow conical element with a plurality of sectors spaced from each other by slots. The cone of the conical element is about 90°. The conical element is made of plastic and has a bore at its open apex directed towards the medium. The bore is closed by the plug. The cross-section of the passage for the medium in the governor is formed by a plurality of slots which separate sectors from each other by the slots, this passage cross-section being reduced automatically upon the increase of the static pressure.

The volume governor of the type under consideration has been discussed, for example in DE-OS No. 3,437,013. This governor has been utilized as water governor. The tendency with such water governors is that at predetermined pressures and medium stream speeds high centrifugal forces causing noise are generated. This results in the fact that water passing the elastic sectors of the conical element causes oscillations of the sectors similarly to the needle pipe.

SUMMARY OF THE INVENTION

It is an object of the present invention to reduce oscillations in the volume governor of the foregoing type.

This and other objects of the invention are attained by a volume governor for flowing media under static pressure formed as a throttle element and comprising a hollow segmented conical member having an angle of cone of about 90° and an open apex provided with a bore and directed towards a medium, and a plug closing said bore, said conical member having a plurality of sectors and a medium passage cross-section formed by a plurality of slots which separate said sectors from each other, said passage cross-section being automatically reduced upon rising of the static pressure, said plug being formed of elastic material with high elastic damping properties and having the bore closed by the plug, and a perforated plate closing a bottom of said conical element and connected to said conical element in a form-locking fashion.

The bore may a have a diameter being of about ⅓ the diameter of said plug.

The advantage of the governor of the invention resides in that oscillations which occur in the space between the bottom perforated plate and the apex of the conical element are damped by the plug. Also, oscillations of lower frequency are reduced. The tendency to oscillations of the governor is therefore altogether substantially reduced.

The conical element may have a flange, the material thickness of said sectors being reduced by a groove at a connection of the conical element to said flange.

The governor may further include bars arranged on said perforated plate in spacings which are not commensurable with said slots.

The bottom plate may have at least one projection engaged in a groove provided in said flange.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a partial sectional view of the flow volume governor according to the invention.

DETAILED DESCRIPTION OF THE PREFERRED EMBODIMENT

Referring now to the drawing in detail the volume governor of the present invention includes a substantially frustoconical, hollow segmented member 10 which has a collar or flange 11 which is closed by a stopper or plug 13 from above. Frustoconical member 10 is formed of a plurality of segments which are supported against plug 13. The latter has a bore 14 and is formed of an elastic plastic preferably with higher material damping properties.

Conical member 10 has an angle of cone of about 90° and is closed from the bottom side with a perforated plate 15. The latter has an inwardly radially extended collar or projection 16. The projection 16 which is formed as a spring-like ring is received in a form-locking fashion in a circular groove 20 provided in the outer peripheral surface of a lower flange 17 of the frustoconical member 10 whereby frustoconical member 10 is connected to the plate 15. Flange 17 serves the purpose of supporting the governor in the wall of a respective fitting. Radial slots 22 a part of one of which is shown in the drawing separate sectors 12 from each other. Groove 18 in the flange 17 reduced the material thickness of the sectors 12 of the governor in the region of the flange.

The resulting hollow body 10, 15 has resonance properties. However, the frequency of sectors 12 lies outside the resonance range of this hollow body. Thereby the danger of generating mechanical vibrations is very small; moreover, vibrations, even if they are generated on sectors 12, quickly die down by dampening of the plug 13. On the other hand, the incorporation of vibrations within the hollow space formed by conical member 10 and the bottom plate 15 obviously substantially enhances damping of vibrations, as has been proved by experiments, Thereby the noise level is significantly decreased.

The tendency to vibrations can be further decreased when the connection of sectors 12 to the flange 17 has a small material thickness due to aforementioned groove 18 because the spring constant of the sectors is thereby smaller.

It has been shown that the groove 18 which collects contamination particles contained in water also prevent depositing contamination particles in the slots 22 between the sectors 12, this also significantly changing flow regulating properties of the governor.

A further possibility to reduce the tendency to vibrations resides in the provision of bars 19 on the bottom plate 15. When the separation of bars 19 is incommensurable with separating sectors 12 i.e. when about five bars and four sectors or seven bars and eight sectors are provided opposite each other, the generation of resonance is reduced. At the same time, pressure stability of the perforated plate 15 is increased.

It will be understood that each of the elements described above, or two or more together, may also find a useful application in other types of volume governors for flowing media differing from the types described above.

While the invention has been illustrated and described as embodied in a volume governor for flowing media, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A volume governor for flowing media under static pressure, formed as a throttle element and comprising a hollow frustoconical member having an open apex, an angle of cone at said apex being of about 90° and an open apex provided with a bore and directed towards a medium, and a plug closing said frustoconical member at said apex, said frustoconical member having a plurality of sectors and a medium passage cross-section formed by a plurality of slots which separate said sectors from each other, said passage cross-section being automatically reduced upon rising of the static pressure, said plug being formed of elastic material with high elastic damping properties and having a bore with a diameter of about one third of said plug and being formed so that it closes said bore with a wall thereof, a perforated plate closing a bottom of said frustoconical member and connected thereto in a form-locking fashion whereby said frustoconical member, said plug and said plate form a unit which is able to dampen noise during operation of the governor; and bars arranged on said perforated plate in spacings which are not commensurable with said slots, said bars being positioned on a side of said plate which faces an interior of said frustoconical member, said frustoconical member having a flange, the material thickness of said sectors being reduced by a groove provided at a connection of the frustoconical member to said flange, said plate having at least one projection engaging in a groove formed in an external wall of said flange.

* * * * *